(12) United States Patent
Tsai

(10) Patent No.: US 12,198,223 B2
(45) Date of Patent: Jan. 14, 2025

(54) CONTROLLER CIRCUIT FOR REDUCING MEMORY USAGE IN ON-SCREEN DISPLAY APPLICATION AND ON-VEHICLE DISPLAY SYSTEM UTILIZING THE SAME

(71) Applicant: NOVATEK Microelectronics Corp., Hsin-Chu (TW)

(72) Inventor: Teng-Yao Tsai, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 193 days.

(21) Appl. No.: 17/947,188

(22) Filed: Sep. 19, 2022

(65) Prior Publication Data

US 2024/0095873 A1  Mar. 21, 2024

(51) Int. Cl.
*G06T 1/60* (2006.01)
*G06T 7/194* (2017.01)

(52) U.S. Cl.
CPC ............... *G06T 1/60* (2013.01); *G06T 7/194* (2017.01)

(58) Field of Classification Search
CPC .................................. G06T 1/60; G06T 7/194
See application file for complete search history.

(56) References Cited

U.S. PATENT DOCUMENTS

| | | | | |
|---|---|---|---|---|
| 2007/0005802 A1* | 1/2007 | Barkowski | ............ | G06F 9/5083 709/240 |
| 2008/0197990 A1* | 8/2008 | Yamamoto | ............. | B60K 35/00 348/E7.086 |
| 2018/0040099 A1* | 2/2018 | Lee | ........................ | G06V 10/751 |
| 2019/0047590 A1* | 2/2019 | Endo | ..................... | G09G 3/2096 |
| 2019/0193562 A1* | 6/2019 | Hou | ........................ | B60K 35/00 |
| 2020/0111452 A1* | 4/2020 | Yamazaki | .............. | B60K 35/55 |
| 2020/0334795 A1* | 10/2020 | Wu | ............................ | G06T 7/74 |
| 2022/0020341 A1* | 1/2022 | Endo | ........................ | G09G 5/38 |
| 2022/0032775 A1* | 2/2022 | Tanibata | ................. | G06T 11/00 |
| 2022/0180528 A1* | 6/2022 | Dundar | .................. | G06N 20/00 |
| 2023/0053042 A1* | 2/2023 | Hung | ..................... | G06F 9/3004 |

FOREIGN PATENT DOCUMENTS

| | | | | |
|---|---|---|---|---|
| CN | 104346029 A | * | 2/2015 | .......... G06F 13/282 |
| CN | 105450942 B | | 10/2018 | |
| CN | 113515376 A | | 10/2021 | |
| TW | 200427312 A | | 12/2004 | |

OTHER PUBLICATIONS

CN104346029A (Machine Translation on May 6, 2024) (Year: 2015).*

* cited by examiner

*Primary Examiner* — Michael Le
(74) *Attorney, Agent, or Firm* — Winston Hsu

(57) ABSTRACT

A controller circuit includes a background buffer, M safety information buffers, and an image mixer. The background buffer is used to store a background image. The M safety information buffers is used to store M images of M selected pieces of safety information, M being a positive integer. The image mixer is coupled to the M safety information buffers and the background buffer, and is used to generate an output image according to the background image and the M images of M selected pieces of safety information.

18 Claims, 3 Drawing Sheets ial CONTROLLER CIRCUIT FOR REDUCING
MEMORY USAGE IN ON-SCREEN DISPLAY
APPLICATION AND ON-VEHICLE DISPLAY
SYSTEM UTILIZING THE SAME

BACKGROUND OF THE INVENTION

1. Field of the Invention

The invention relates to image processing, and specifically, to a controller circuit for reducing memory usage in on-screen display application and on-vehicle display system utilizing the same.

2. Description of the Prior Art

Safety display has been widely adopted in modern life. For example, in automotive industry, on which images containing safety information can be generated in real time by a host processor and then passed to the instrument panel (or the digital dashboard) of a vehicle for display. The vehicle can be a motor vehicle such as a car, a railed vehicle such as a train, watercraft or aircraft. Nevertheless, as the host processor can be located far from the instrument panel, the data of the safety information images may be lost or degraded by noise during transmission to the instrument panel.

SUMMARY OF THE INVENTION

According to an embodiment of the invention, a controller circuit includes a background buffer, M safety information buffers, and an image mixer. The background buffer is used to store a background image. The M safety information buffers is used to store M images of M selected pieces of safety information, M being a positive integer. The image mixer is coupled to the M safety information buffers and the background buffer, and is used to generate an output image according to the background image and the M images of M selected pieces of safety information.

According to another embodiment of the invention, an on-vehicle display system includes a display panel, a host processor and a controller circuit. The controller circuit is coupled to the display panel and the host processor and includes a background buffer, M safety information buffers, and an image mixer. The background buffer is used to store a background image. The M safety information buffers is used to store M images of M selected pieces of safety information, M being a positive integer. The image mixer is coupled to the M safety information buffers and the background buffer, and is used to generate an output image according to the background image and the M images of M selected pieces of safety information, and output the output image to the display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
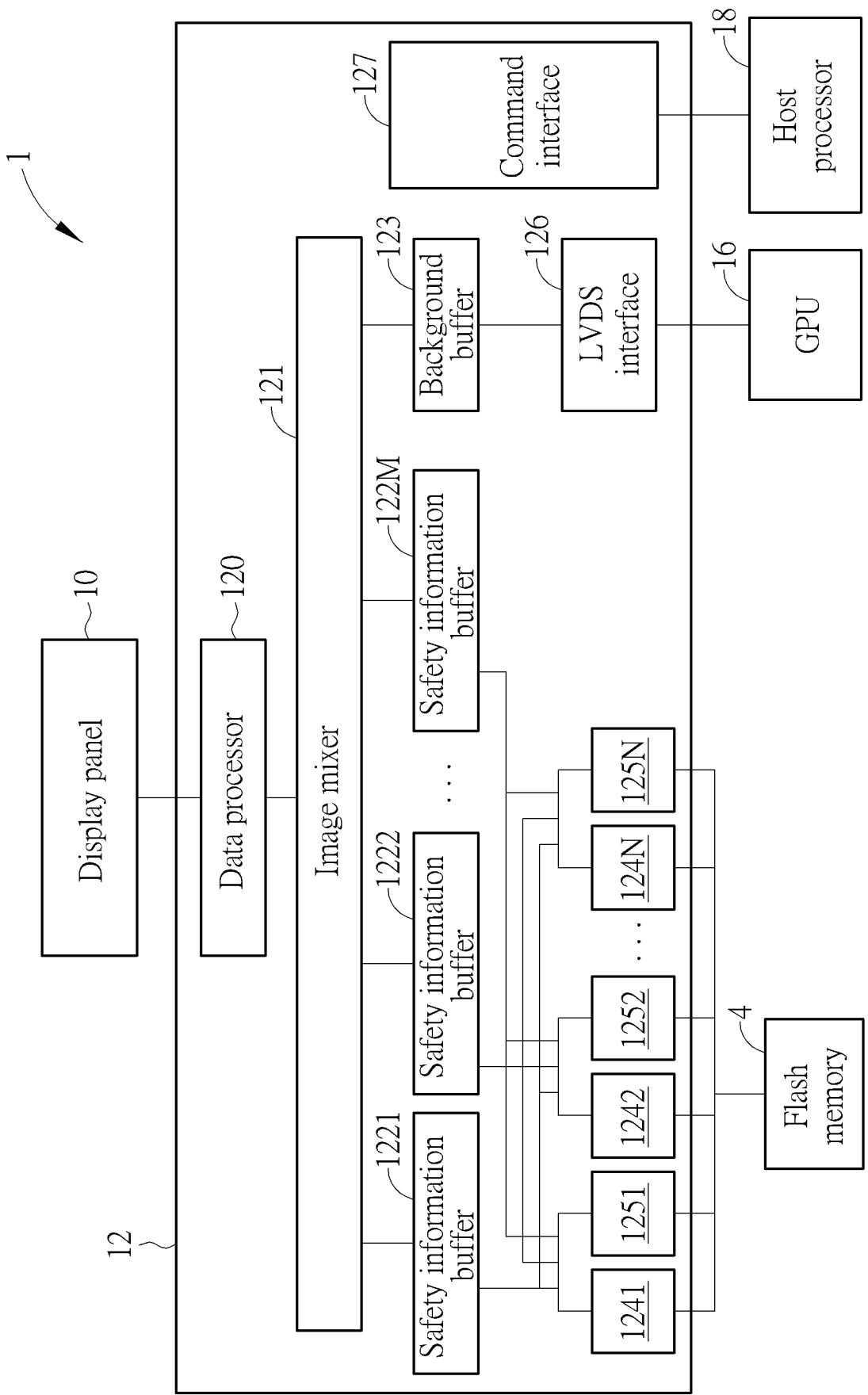
FIG. 1 is a block diagram of an on-vehicle display system according to an embodiment of the invention.

FIG. 1 is a block diagram of an on-vehicle display system 1 according to an embodiment of the invention. The on-vehicle display system 1 may be implemented on a vehicle to offer reliable information display while reducing the memory usage.

The on-vehicle display system 1 may include a display panel 10, a host processor 18 and a controller circuit 12. The controller circuit 12 may be implemented in a driver integrated circuit (IC), a display driver, a timing controller, or other display control circuits. The display panel 10 may be a touch panel, and may display an image of a speedometer. The controller circuit 12 may be coupled to the display panel 10 and the host processor 18. Further, the controller circuit 12 may be arranged physically close to the display panel 10 and far apart from the host processor 18. Furthermore, the controller circuit 12 may locally store images/parameters of pieces of safety information, and receive a command from the host processor 18 to generate safety information images using the images/parameters of the pieces of safety information, so as to generate an output image to be displayed on the display panel 10. In some embodiments, each piece of safety information may be an on-screen display (OSD) character, each safety information image may be an OSD image, and the output image may be an overlay image of overlaying the safety information images on a background image. In some embodiments, the output image may be a vehicle digital dashboard including driving information, road safety information, and/or mode control, and may be crucial for driving safety. The close arrangement between the controller circuit 12 and the display panel 10 may ensure an accurate and reliable display of the vehicle digital dashboard, leading to improvement of the driving safety.

The controller circuit 12 may include an image mixer 121, safety information buffers 1221 to 122M, a background buffer 123, parameter memories 1241 to 124N, and image memories 1251 to 125N. N, M may be positive integers, and N may be equal to or different from M, e.g., N=10, M=3. The image mixer 121 may be coupled to the safety information buffers 1221 to 122M and the background buffer 123. Each of the safety information buffers 1221 to 122M may be coupled to the image memories 1251 to 125N and the parameter memories 1241 to 124N.

The image memories 1251 to 125N may store N images of N pieces of safety information. The parameter memories 1241 to 124N may store N sets of parameters of the N pieces of safety information. The pieces of safety information may be numbers, alphabets, symbols, and the like, and may be different from each other. The images of the pieces of safety information may be bitmap data of the pieces of safety information. Each set of parameters of a piece of safety information may include a color scheme, a transparency level, position coordinates, a resolution setting, a scaling factor, a width, and/or a length of the piece of safety information. For example, if N=10, the 10 pieces of safety information may be digits 0 to 9, the image memories 1251 to 12510 may respectively store bitmap data of the digits 0 to 9, and the parameter memories 1241 to 12410 may each store a color scheme, a transparency level, position coordinates, a resolution setting, a scaling factor, a width, and/or a length of one of the digits 0 to 9. In the embodiment, the image memories 1251 to 125N may be implemented by static random-access memories (SRAM), and the parameter memories 1241 to 124N may be implemented by data registers, while in other embodiments, other types of volatile memories may be used for implementing the image memories 1251 to 125N and/or the parameter memories 1241 to 124N.

Prior to generation of an output image, all pieces of safety information used in the output image must be ready. Therefore, each of the safety information buffers 1221 to 122M may buffer an image of a selected piece of safety information and a set of parameters of the selected piece of safety information, the selected piece of safety information being selected from the N pieces of safety information to be used in the output image. Accordingly, the safety information buffers 1221 to 122M may buffer M images of M selected pieces of safety information and M sets of parameters of the M selected piece of safety information. The M selected pieces of safety information may be identical or different from each other. In some embodiments, two or more of the M selected pieces of safety information may be identical to each other. For instance, if M=3 and all the 3 selected pieces of safety information are the digit 1, each of the safety information buffers 1221 to 1223 may hold the image of the digit 1 and the set of parameters of the digit 1. In this fashion, the images of the pieces of safety information in the image memories 1251 to 125N and the sets of parameters of the pieces of safety information in the parameter memories 1241 to 124N may be reused to generate an output image, reducing the usage of the image memories 1251 to 125N and the parameter memories 1241 to 124N, and reducing the manufacturing cost. The safety information buffers 1221 to 122M may be line buffers implemented by SRAM.

The background buffer 123 may store a background image, and may be a line buffer implemented by SRAM. The background image may be a still image or a video image. The image mixer 121 may load the M images of M selected pieces of safety information and M sets of parameters of the M selected pieces of safety information from the safety information buffers 1221 to 122M, generate M safety information images according to M images of M selected pieces of safety information and M sets of parameters of the M selected pieces of safety information, and combine the M safety information images and the background image to generate an output image, and output the output image to the display panel 10. In some embodiments, the image mixer 121 may map colors of the M safety information images according to the respective color schemes, set the transparencies of the M safety information images according to the respective transparency levels, modify the resolutions of the M safety information images according to the respective resolution settings, scale the M safety information images according to the respective scaling factors, the respective widths and the respective lengths, and overlay the M safety information images on predetermined regions on the background image according to respective position coordinates to generate the output image. The processes of generating the output image merely serve as an example, a person skilled in the art would recognize that the image mixer 121 may process the M safety information images in a variety of fashions to provide favorable image quality of the output image for displaying on the display panel 10.

The controller circuit 12 may further include a command interface 127 configured to receive a command from the host processor 18, and in response to the command, the safety information buffers 1221 to 122M may receive the M images of the M selected pieces of safety information and the M sets of parameters of the M selected pieces of safety information according to the command. The command interface 127 may be an inter-integrated circuit (I2C) interface, a serial peripheral interface (SPI), or other communication interfaces.

The on-vehicle display system 1 may further include a flash memory 14 coupled to the image memories 1251 to 125N and the parameter memories 1241 to 124N. Upon initialization of the on-vehicle display system 1, the image memories 1251 to 125N may retrieve the N images of N pieces of safety information from the flash memory 14, and the parameter memories 1241 to 124N may retrieve the N sets of parameters of the N pieces of safety information from the flash memory 14.

The controller circuit 12 may further include a low voltage differential signaling (LVDS) interface 126 configured to receive the background image from a graphics processing unit (GPU) 16. In some embodiment, the LVDS interface 126 may be replaced by other video interfaces such as a DisplayPort interface, a digital visual interface (DVI), or a high-definition multimedia interface (HDMI). In some embodiments, the GPU 16 and the host processor 18 may be integrated into one single processor.

The controller circuit 12 may further include a data processor 120 coupled to the image mixer 121. The data processor 120 may receive the output image from the image mixer 121, apply gamut mapping to the output image using a color lookup table to generate a corrected output image, and generate control signals according to image data of the corrected output image to control gate drivers and source drivers of the display panel 10 to display the corrected output image.

In the related art, each the safety information image can be retrieved from only an SRAM address of a conventional controller circuit. Consequently, the conventional controller circuit employs 10 SRAMs holding images of numbers 0 to 9 for a single-digit display in a speedometer, and employs 30 SRAMs holding images of numbers 0 to 9 for a three-digit display in the speedometer. Compared to the related art, the controller circuit 12 employs only 10 SRAMs for a three-digit display in the speedometer, reducing by ⅔ of the memory usage in the related art, displaying the safety information images on the display panel 10 in a reliable manner regardless of the host processor 18 being operated in normal or abnormal conditions, significantly enhancing driving safety of the driver.

Figure 2:
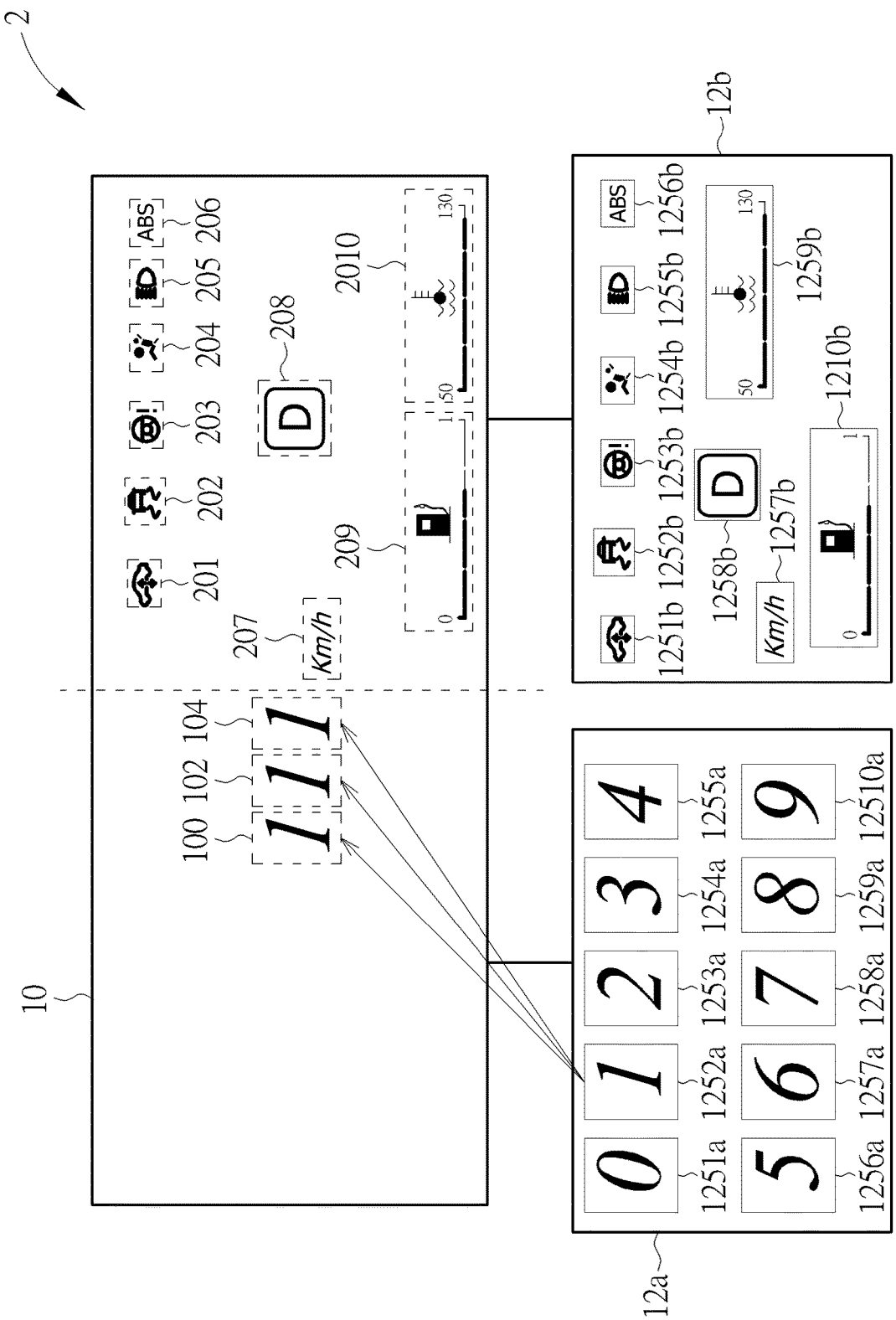
FIG. 2 is a schematic diagram of an on-vehicle display system according to another embodiment of the invention.

While only one controller circuit 12 is adopted in the embodiment in FIG. 1, other numbers of controller circuits 12 may be adopted. FIG. 2 is a schematic diagram of an on-vehicle display system 2 adopting two controller circuits 12a and 12b according to another embodiment of the invention. The on-vehicle display system 2 is similar to the on-vehicle display system 1, except that controller circuits 12a and 12b are adopted in the on-vehicle display system 2, other components of the on-vehicle display system 2 are similar to the on-vehicle display system 1 and may not be shown in FIG. 2. The following discussion will be focused on the controller circuits 12a and 12b and the display panel 10 of the on-vehicle display system 2.

The display panel 10 may display output images including regions 100, 102, 104, and 201 to 2010 for displaying a vehicle digital dashboard. The positions and dimensions of the regions 100, 102, 104, and 201 to 2010 may be defined by the respective position coordinates, widths and lengths as in the sets of parameters of the selected pieces of safety information. The pieces of safety information may be related to driving information such as speedometer data and fuel meter data, road safety such as the engine temperature and the airbag warning indicator, and/or mode control such as turning-on a mode or turning-off a mode. The vehicle digital dashboard may include a digital speedometer in regions 100, 102, 104 and 207, a digital fuel meter in the region 209, an engine temperature meter in the region 2010, a driving mode in the region 208, and various warning indicators in the regions 201 to 206.

The controller circuits 12*a* may include image memories 1251*a* to 12510*a* to hold images of the digits 0 to 9, respectively, to generate a first output image including the regions 100, 102 and 104. The controller circuits 12*b* may include image memories 1251*b* to 12510*b* to hold images of the various warning indicators, a speedometer unit, the driving mode, the digital fuel meter, and the engine temperature meter, respectively, to generate a second output image including the regions 201 to 2010. The controller circuits 12*a* may include parameter memories matching the image memories 1251*a* to 12510*a* for use to hold the sets of parameters for generating the first output image, and the controller circuits 12*b* may include parameter memories matching the image memories 1251*b* to 12510*b* for use to hold the sets of parameters for generating the second output image.

Accordingly, the images and sets of parameters of identical pieces of safety information may be loaded from the same image memory and parameter memory to reduce the usage of the memories in the on-vehicle display system 2, and reduce the manufacturing cost. For example, if a number "111" is to be displayed in the first output image, the images and sets of parameters of the digit 1 may be loaded 3 times from the same image memory 1251*a* and the same matching parameter memory to derive the first output image.

Figure 3:
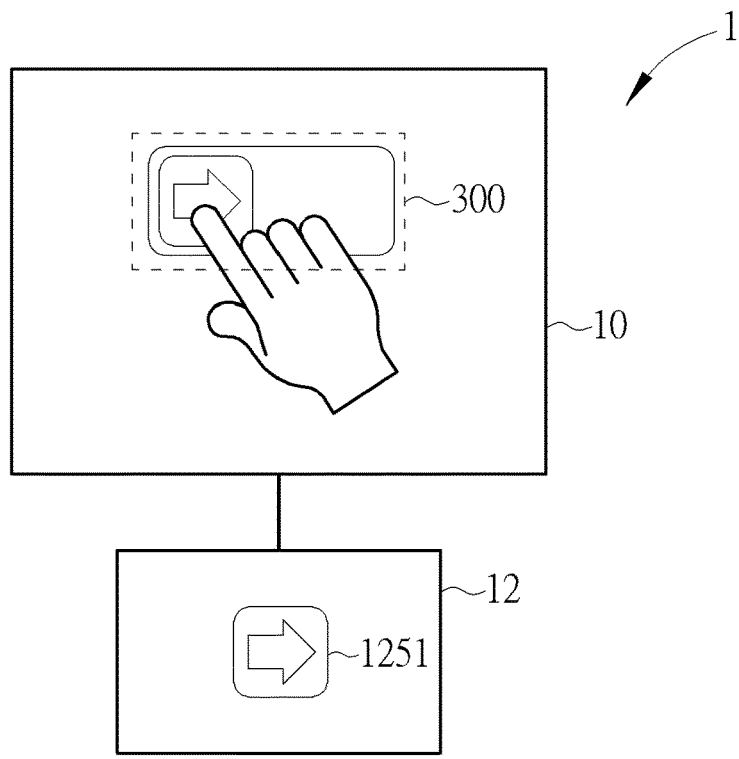
FIG. 3 is a schematic diagram of the on-vehicle display system in FIG. 1 according to another embodiment of the invention.

FIG. 3 is a schematic diagram of the on-vehicle display system 1 according to another embodiment of the invention. FIG. 3 shows a slider control bar for switching a mode in the on-vehicle display system 1. For example, the mode may be an anti-lock braking mode, a user may swipe right the slider control icon with a finger to turn on the anti-lock braking mode.

The display panel 10 may display an output image including a region 300. The controller circuit 12 may include an image memory 1251 to hold an image of the slider control icon and a matching parameter memory to hold a set of parameters of the slider control icon. The position and dimension of the region 300 may be defined by the respective position coordinates, width and length as in the set of parameters of the slider control icon. The on-vehicle display system 1 may generate a safety information image of a slider control bar according to the image and the set of parameters of the slider control icon, generate the output image to be displayed in the region 300 according to the safety information image, and output the output image to the display panel 10.

Figure 4:
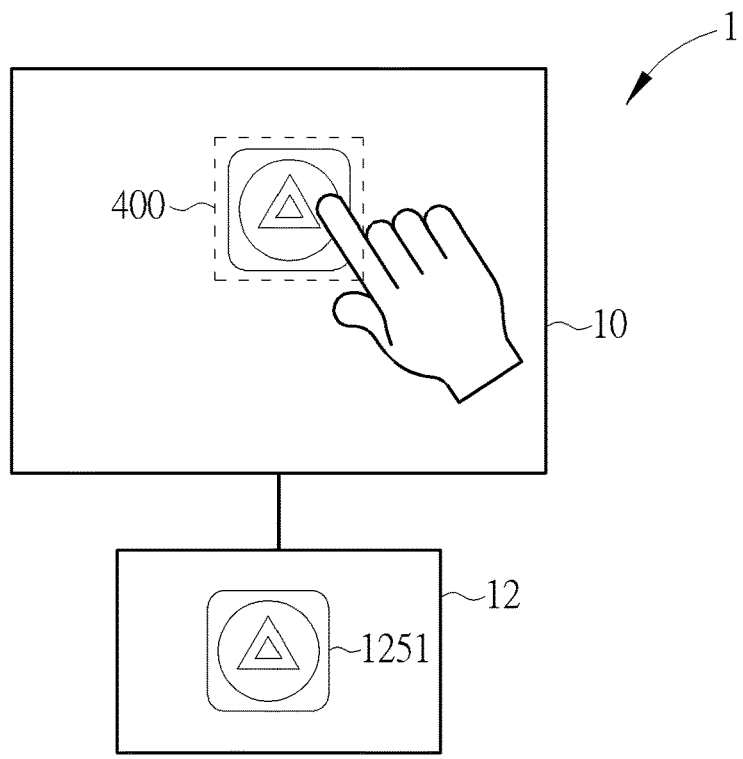
FIG. 4 is a schematic diagram of the on-vehicle display system in FIG. 1 according to another embodiment of the invention.

FIG. 4 is a schematic diagram of the on-vehicle display system 1 according to another embodiment of the invention. FIG. 4 shows a soft key control for switching a mode in the on-vehicle display system 1. For example, the mode may be the anti-lock braking mode, a user may touch or apply pressure to the soft key to turn on/off the anti-lock braking mode.

The display panel 10 may display an output image including a region 400. The controller circuit 12 may include an image memory 1251 to hold an image of the soft key icon and a matching parameter memory to hold a set of parameters of the soft key icon. The position and dimension of the region 400 may be defined by the respective position coordinates, width and length as in the set of parameters of the soft key icon. The on-vehicle display system 1 may generate a safety information image of the soft key according to the image and the set of parameters of the soft key icon, generate the output image to be displayed in the region 400 according to the safety information image, and output the output image to the display panel 10.

Accordingly, the on-vehicle display systems in FIGS. 1 to 4 employ limited quantities of the image memories and parameter memories in the controller circuit to ensure an accurate and reliable display, while employing the safety information buffers in the controller circuit to reduce the usage of image memories and parameter memories and reduce the manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller circuit comprising:
  a background buffer configured to store a background image;
  N image memories configured to store N images of N pieces of safety information, N being a positive integer;
  N parameter memories configured to store N sets of parameters of the N pieces of safety information;
  M safety information buffers configured to store M images of M selected pieces of safety information and M sets of parameters of the M selected pieces of safety information, M being a positive integer, each safety information buffer being coupled to the N image memories and the N parameter memories to store an image of a selected piece of safety information and a set of parameters of the selected piece of safety information, the selected piece of safety information being selected from the N pieces of safety information; and
  an image mixer coupled to the M safety information buffers and the background buffer, and configured to generate an output image according to the background image, the M set of parameters of the M selected piece of safety information, and the M images of the M selected pieces of safety information.

2. The controller circuit of claim 1, wherein
  the image mixer is configured to generate M safety information images according to the M images of the M selected pieces of safety information and the M sets of parameters of the M selected pieces of safety information from the M safety information buffers, and combine the M safety information images and the background image to generate the output image.

3. The controller circuit of claim 1, wherein the N pieces of safety information are N on-screen display (OSD) characters.

4. The controller circuit of claim 1, wherein two of the M selected pieces of safety information are identical.

5. The controller circuit of claim 1, further comprising a command interface configured to receive a command, wherein the M safety information buffers receive the M images of the M selected pieces of safety information and the M sets of parameters of the M selected pieces of safety information according to the command.

6. The controller circuit of claim 1, wherein:
the N image memories are configured to retrieve the N images of N pieces of safety information from a flash memory; and
the N parameter memories are configured to retrieve the N sets of parameters of the N pieces of safety information from the flash memory.

7. The controller circuit of claim 1, further comprising a low voltage differential signaling (LVDS) interface configured to receive the background image.

8. The controller circuit of claim 1, wherein the N image memories are static random-access memories (SRAM).

9. An on-vehicle display system comprising:
a display panel;
a host processor; and
a controller circuit coupled to the display panel and the host processor, the controller circuit comprising:
  a background buffer configured to store a background image;
  N image memories configured to store N images of N pieces of safety information, N being a positive integer;
  N parameter memories configured to store N sets of parameters of the N pieces of safety information;
  M safety information buffers configured to store M images of M selected pieces of safety information and M sets of parameters of the M selected pieces of safety information, M being a positive integer, each safety information buffer being coupled to the N image memories and the N parameter memories to store an image of a selected piece of safety information and a set of parameters of the selected piece of safety information, the selected piece of safety information being selected from the N pieces of safety information; and
  an image mixer coupled to the M safety information buffers and the background buffer, and configured to generate an output image according to the background image, the M set of parameters of the M selected piece of safety information, and the M images of the M selected pieces of safety information, and output the output image to the display panel.

10. The on-vehicle display system of claim 9, wherein the image mixer is configured to generate M safety information images according to the M images of the M selected pieces of safety information and the M sets of parameters of the M selected pieces of safety information from the M safety information buffers, and combine the M safety information images and the background image to generate the output image.

11. The on-vehicle display system of claim 9, wherein the N pieces of safety information are N on-screen display (OSD) characters.

12. The on-vehicle display system of claim 9, wherein two of the M selected pieces of safety information are identical.

13. The on-vehicle display system of claim 9, wherein the controller circuit further comprises a command interface configured to receive a command from the host processor, and the M safety information buffers receive the M images of the M selected pieces of safety information and the M sets of parameters of the M selected pieces of safety information according to the command.

14. The on-vehicle display system of claim 9, further comprises:
a flash memory coupled to the N image memories and the N parameter memories;
wherein the N image memories are configured to retrieve the N images of N pieces of safety information from the flash memory; and
the N parameter memories are configured to retrieve the N sets of parameters of the N pieces of safety information from the flash memory.

15. The on-vehicle display system of claim 9, further the controller circuit further comprises a low voltage differential signaling (LVDS) interface configured to receive the background image.

16. The on-vehicle display system of claim 9, wherein the N image memories are static random-access memories (SRAM).

17. A controller circuit comprising:
a background buffer configured to store a background image;
M safety information buffers configured to store M images of M selected pieces of safety information and M sets of parameters of the M selected pieces of safety information, M being a positive integer; and
an image mixer coupled to the M safety information buffers and the background buffer, and configured to generate an output image according to the background image, the M sets of parameters of the M selected pieces of safety information, and the M images of the M selected pieces of safety information;
wherein two of the M selected pieces of safety information are identical.

18. An on-vehicle display system comprising:
a display panel;
a host processor; and
a controller circuit coupled to the display panel and the host processor, the controller circuit comprising:
  a background buffer configured to store a background image;
  M safety information buffers configured to store M images of M selected pieces of safety information and M sets of parameters of the M selected pieces of safety information, M being a positive integer; and
  an image mixer coupled to the M safety information buffers and the background buffer, and configured to generate an output image according to the background image, the M sets of parameters of the M selected pieces of safety information, and the M images of M selected pieces of safety information, and output the output image to the display panel;
wherein two of the M selected pieces of safety information are identical.

* * * * *